(12) United States Patent
Inui

(10) Patent No.: US 6,847,986 B2
(45) Date of Patent: *Jan. 25, 2005

(54) DIVIDER

(75) Inventor: Shigeto Inui, Tokyo (JP)

(73) Assignee: NEC Corporation, Tokyo (JP)

( * ) Notice: Subject to any disclaimer, the term of this patent is extended or adjusted under 35 U.S.C. 154(b) by 525 days.

This patent is subject to a terminal disclaimer.

(21) Appl. No.: 09/778,258

(22) Filed: Feb. 7, 2001

(65) Prior Publication Data

US 2001/0025293 A1 Sep. 27, 2001

(30) Foreign Application Priority Data

Feb. 7, 2000 (JP) ....................................... 2000-029524

(51) Int. Cl.[7] ................................................ G06P 7/52
(52) U.S. Cl. ..................................................... 708/656
(58) Field of Search ............................... 708/504, 650, 708/651, 652, 653, 654, 655, 656

(56) References Cited

U.S. PATENT DOCUMENTS

| | | | | |
|---|---|---|---|---|
| 4,949,295 A | * | 8/1990 | Stearns | 708/504 |
| 5,777,917 A | * | 7/1998 | Chung | 708/656 |
| 5,818,745 A | * | 10/1998 | Sheaffer | 708/656 |
| 5,910,910 A | * | 6/1999 | Steele, Jr. | 708/650 |

FOREIGN PATENT DOCUMENTS

| | | |
|---|---|---|
| JP | 7-248899 | 9/1995 |
| JP | 2000-10763 | 1/2000 |

OTHER PUBLICATIONS

Japanese Article, "Design of a Radix–4 Divider Without a Quotient Selection Table" by O.Miura, et al. (Proceedings of the 1998 Conference of The Institute of Electronics, Information and Communication Engineers, Japan, Electronics [2]), p. 154.

Japanese Article, "High–speed Operation Methods of a Computer" (Kindai Kagaku Co., Ltd. 1980) p:214–249.

* cited by examiner

Primary Examiner—Chuong Dinh Ngo
(74) Attorney, Agent, or Firm—Scully, Scott Murphy & Presser (57) ABSTRACT

A higher-radix type divider is provided which is capable of obtaining a quotient at a high speed by performing a scaling on a divisor and by representing a partial remainder in a redundant binary notation.

The divider for obtaining the quotient by referring to the divisor and dividend normalized respectively so as to satisfy a range of $½^K$ or more and less an $½^{K+1}$ (k being a positive integer) and to a length of bits, out of all bits of the partial remainder, defined by a radix for operations and a maximum number of digits, is provided with a scaling factor generating section, a multiplying section, a divisor tripled-number generating section and a repetitive operating section.

5 Claims, 7 Drawing Sheets

DIVIDER

BACKGROUND OF THE INVENTION

1. Field of the Invention

The present invention relates to a divider and more particularly to a higher-radix type of digital divider.

The present application claims priority of Japanese Patent Application No.2000-029524 filed on Feb. 7, 2000, which is hereby incorporated by reference.

2. Description of the Related Art

For example, in "Design of a Radix-4 Divider Without a Quotient Selection Table" by O. Miura, et al. (Proceedings of the 1998 Conference of The Institute of Electronics, Information and Communication Engineers, Japan, Electronics [2]), a higher-radix divider to be implemented on an LSI (Large Scale Integrated circuit) is introduced.

As a divider that can be implemented on the LSI, the divider using a subtraction shift method or a subtraction non-restoring method as a division algorithm is generally used because a divider using such division algorithms can provide well-balanced amounts of hardware and performance. Such division algorithms can be performed in a same way as division is done normally using figures on a piece of paper, that is, it is a method in which the division is done by obtaining a quotient, shifting a remainder (that is, a partial remainder) and subtracting a multiple of a denominator (a divisor) from the quotient. A variety of the division algorithms including restoring division, non-restoring division, SRT (Sweeney, Robertson and Tocher) division, generalized SRT division methods are disclosed in "High-speed Operation Methods of a Computer" (Kindai Kagaku Co., Ltd. 1980).

First, a general-purpose procedure for division using the subtraction shift method is briefly explained below. Let it be presumed that a bit length for an operation is n (an arbitrary positive integer), a radix for the operation is r, a divisor is D, a dividend is R (0), a partial remainder obtained by j-th time operations is R (j) (j is an integer being zero or greater) and a quotient obtained by the j-th time operation is q (j) (j is the integer being zero or greater). Also, let it be assumed that the divisor D and the dividend R (0) have been normalized. Moreover, let it be assumed that, as a normalized floating-point format, $\lceil 1.\text{xxxx} \rceil$ is used. Even when data form not matching with the normalized floating-point format is dealt, by performing an appropriate shift processing before and after operations, the data format can be treated in the normalized floating-point format.

The quotient and partial remainder used in this method are represented by a redundant binary notation. That is, if twos complement notation is employed, each bit is represented as $\{0, 1\}$, however, in this method, ternary $\{-1, 0, 1\}$ can be taken and a negative number can be also used.

Under such conditions as input data is normalized as described above, the quotient and partial remainder can be sequentially obtained by using the following recurrence equation (1):

$$R(j+1) = r \times R(j) - q(j+1) \times D \quad (1).$$

At this point, the quotient q (j+1) is selected from digit set defined by the radix r in a manner so as to satisfy the following equation (2):

$$0 \leq |R(j+1)| < k \times D \quad (2)$$

where k represents a constant that satisfies the following equation (3):

$$k = m/(r-1) \quad (3)$$

where m represents a digit having a largest absolute value out of the digit set in a mathematical system of the radix r. In this case, since a minimum value of m is ½×r and a maximum value is r−1, a range of the k is given by the following expression (4):

$$\tfrac{1}{2} \leq k < 1 \quad (4).$$

When the mathematical system of the radix 4 is taken as an example, the digit set possibly includes two states: $\{-3, -2, -1, 0, 1, 2, 3\}$ and $\{-2, -1, 0, 1, 2\}$. In the former case, k=1 and, in the latter case, k=⅔. The equation (2) indicates that the smaller a value of k, the narrower a value range of the partial remainder during operations. That is, since, in the latter case, a tripled number cannot be selected as a multiple of the divisor, by imposing a limitation on the value range of the partial remainder obtained during operations, division is allowed to be done until the multiple of the divisor becomes a double value of the devisor. Moreover, in the case of the mathematical system of the radix of 2, the digit set is $\{-1, 0, 1\}$ in which k=1. When the quotient is obtained by using the equation (1), since the number of bits of the quotient that can be obtained by one time division is $\log_2 r$, a quotient having desired number of bits can be obtained by repeating the division by $n/\log_2 r$ times.

Figure 6:
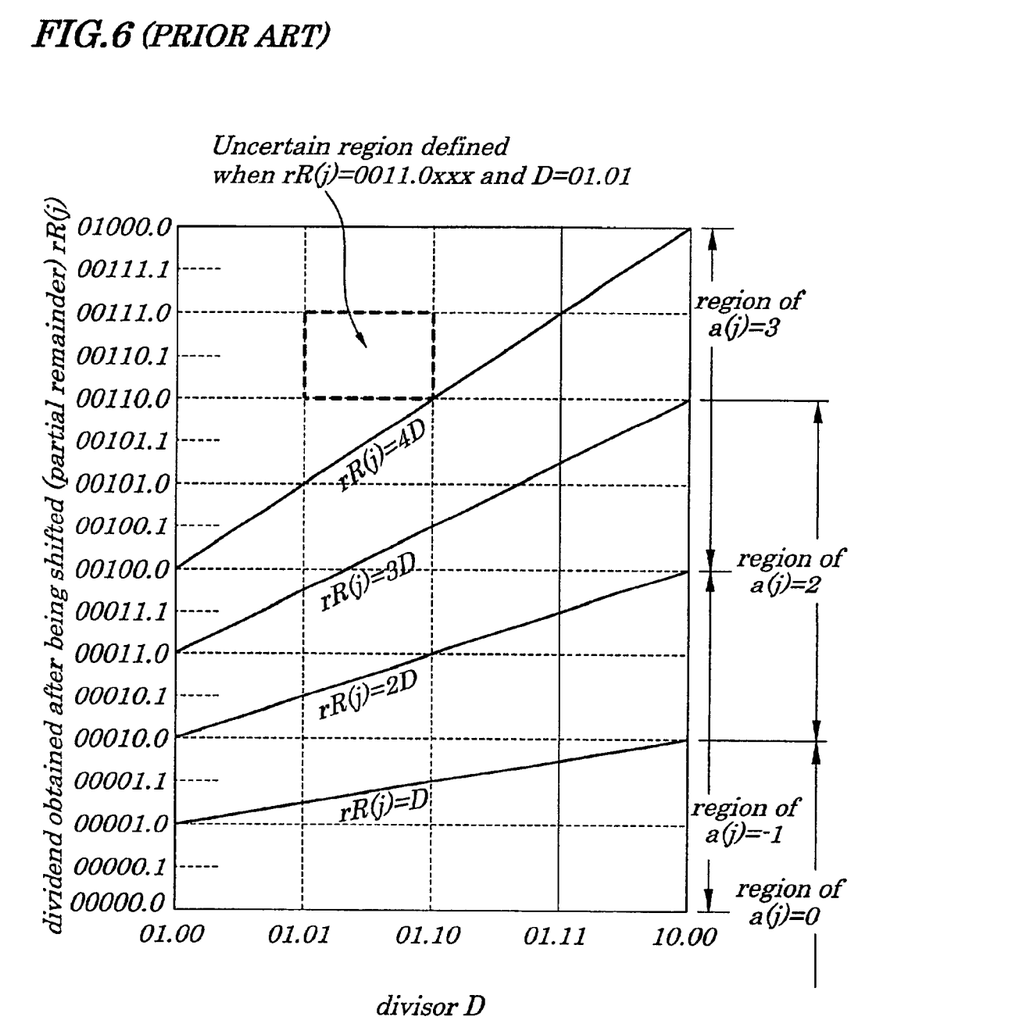
FIG. 6 is a graph showing a P-D plot expressing a conventional division algorithm.

The division algorithm described above can be expressed by a graph called a P-D (Partial Remainder-Divisor) plot. FIG. 6 is a graph showing the P-D plot expressing the division algorithm described above. The divisor is plotted as abscissa and the partial remainder obtained by multiplying the divisor by the radix (hereinafter the partial remainder obtained by multiplying the divisor by the radix being referred to simply as a partial remainder obtained after being shifted) as ordinate. However, since the P-D plot is produced so as to be symmetric with respect to an x-axis, only a positive range of a y-axis is shown in the P-D plot. When the division algorithm represented by the P-D plot the quotient can be obtained by making a reference to high-order 2 bits excluding a MSB (Most Significant Bit) of the divisor D and to high-order 5 bits of the partial remainder obtained after being shifted. Let it be assumed that the bits of the partial remainder obtained after being shifted to be referred are represented in twos complement notation. The reference to the MSB of the divisor, since the MSB is assured to be 1 due to normalization, is not required. Since the number of bits of the divisor to be referred is two, an entire P-D plot can be partitioned into four regions depending on the range of the divisor and, in each of the regions, one quotient value can be associated with a value making up of high-order 5 bits represented in a notation of a complement of the partial remainder obtained after being shifted. A pair of high-order 2 bits of the divisor (except its MSB) and high-order 5 bits, in twos complement notation, of the partial remainder obtained after being shifted are representative of values in a specified range on the P-D plot. If high-order 2 bits of the divisor (except its MSB) is Dt, a true divisor D exists in the following range:

$$1 + Dt \leq D < 1 + Dt + \tfrac{1}{4} \quad (5).$$

Moreover, if high-order 5 bits, in twos complement notation, of the partial remainder obtained after being shifted is Rt (j), a true value rR (j) of the partial remainder obtained after being shifted exists in the following range:

$$Rt(j) - \tfrac{1}{2} < rR(j) < Rt(j) + \tfrac{1}{2} \quad (6).$$

Since the partial remainder is represented by the redundant binary notation, there is a likelihood that another true value exists in a region in a negative direction with respect to the Rt (j). A rectangular region on the P-D plot expressed by the expressions (5) and (6) is a region where the true divisor and partial remainder exist, which is hereinafter called an uncertain region. To obtain the quotient by making a reference only to high-order bits of the divisor and of the partial remainder means that the quotient is obtained so as to satisfy the equation (2) for all values in the uncertain regions. For example, when 3 is selected as the quotient, a region between a straight line expressed by rR (j)=4D and a straight line expressed by rR (j) =2D, by the equations (1) and (2), is the one where 3 can be selected and only when the uncertain region falls within this range, 3 can be selected. To make the uncertain region larger means that the number of bits of the divisor and partial remainder to be referred is decreased, thus allowing a logic to obtain the quotient to be simplified. Therefore, it is important that a maximum uncertain region is selected while the equations (1) and (2) are satisfied. Moreover, the bits, to be referred, of the partial remainder obtained after being shifted required for obtaining the quotient has to be converted, prior to obtaining the quotient, from the redundant binary notation to the twos complement notation.

In the division algorithm described above, it is necessary to determine the uncertain region by making a reference to two bits existing subsequent to an MSB of the divisor D and high-order 5 bits of the partial remainder obtained after being shifted. At this point, by selecting a multiplication factor so that the divisor falls in any one of the four regions on the P-D plot decided by the referred 2 bits of the divisor and by multiplying, before operations, the divisor and dividend by the multiplication factor, the reference to the 2 bits of the divisor is not required when the quotient is obtained. It is obvious from characteristics of the division that, even if the divisor and the partial remainder are multiplied by a same multiplication factor before operations, no change occurs in the obtained quotient.

Thus, the method in which division is made high-speed by multiplying a coefficient (hereinafter referred to as the multiplication factor) properly selected before start of division is called a scaling. For example, by performing the scaling of the divisor so that a range of the divisor satisfies an expression of 1.50≦the divisor<1.75 and by making non-redundant the high-order 5 bits of the partial remainder obtained after being shifted, that is, by representing the high-order 5 bits in twos complement notation, the quotient can be obtained by referring only to high-order 4 bits of the partial remainder obtained after being shifted. In the scaling method, the multiplication factor is predetermined for every range of the divisor and the divisor is multiplied by the multiplication factor to perform the scaling of the divisor so that the range of the divisor satisfies the expression of 1.50≦the divisor<1.75.

| Range of divisor | Multiplication factor | Combination of multiple |
|---|---|---|
| 1.125 ≦ divisor < 1.250 | 1.500 | 1 + ½ |
| 1.125 ≦ divisor < 1.250 | 1.375 | 1 + ¼+ ⅛ |
| 1.250 ≦ divisor < 1.375 | 1.250 | 1 + ¼ |
| 1.375 ≦ divisor < 1.500 | 1.125 | 1 + ⅛ |
| 1.500 ≦ divisor < 1.625 | 1.000 | 1 |
| 1.625 ≦ divisor < 1.750 | 1.000 | 1 |
| 1.750 ≦ divisor < 1.875 | 0.875 | 1 − ⅛ |
| 1.875 ≦ divisor < 2.000 | 0.875 | 1 − ⅛ |

Figure 7:
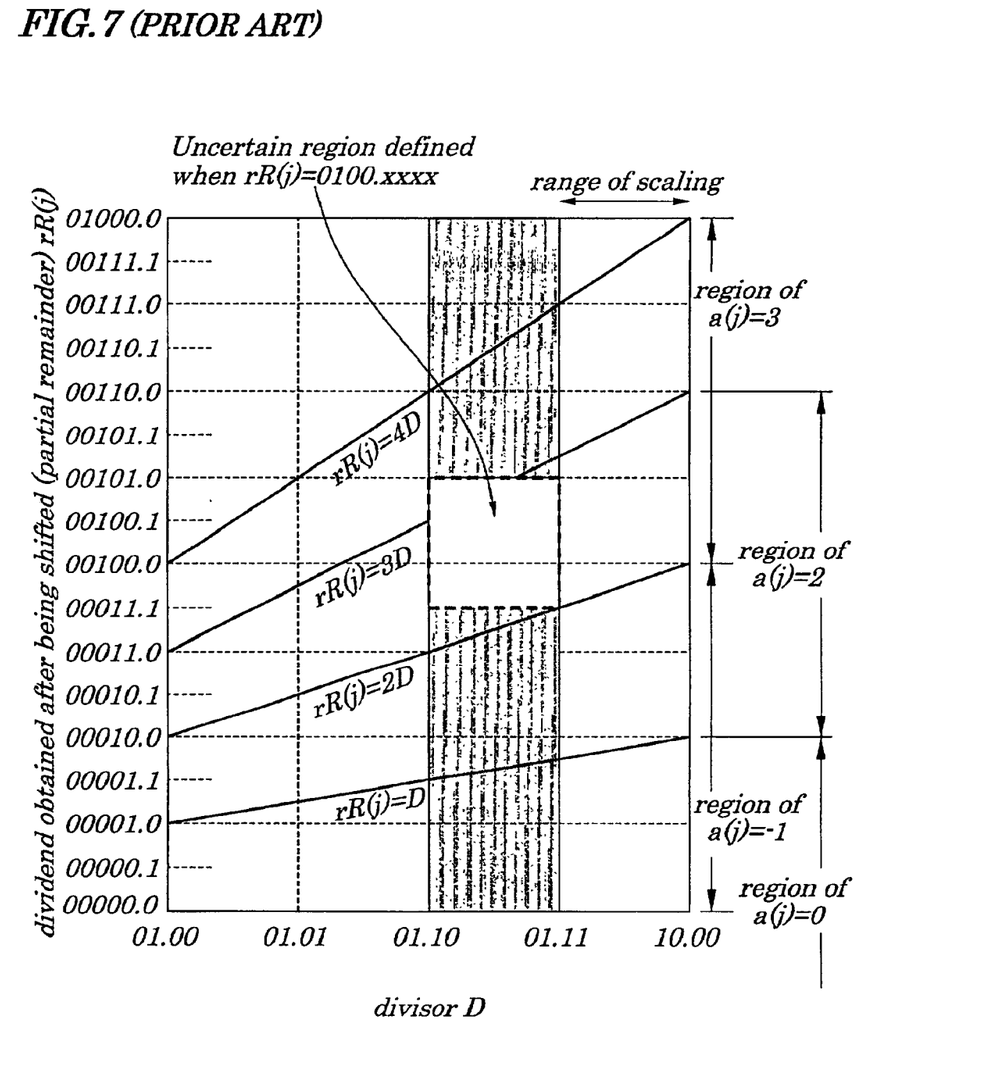
FIG. 7 is a graph showing another P-D plot explaining the conventional division algorithm.

Moreover, the above multiplication factor, since it can be implemented by combination of a multiple of ±½$^n$ (however, the n is a natural number including 0) as shown in the above combination of multiples, can be produced by only shifting and addition. To identify the range of the above divisor, reference to high-order 3 bits of the divisor except its MSB is all that is needed. The reference to the MSB of the divisor, since the MSB is assured to be always 1 due to normalization, is not required. As a result of the above multiplication, the scaling of the divisor is performed so that a range of the divisor satisfies an expression of 1.50≦divisor<1.75. FIG. 7 is a graph showing another P-D plot expressing the division algorithm. In the division algorithm shown in FIG. 7, the reference to the divisor is not required and, moreover, expansion of the uncertain region by 1.5-fold in a y-direction is made possible, unlike the case where no scaling of the uncertain region is performed, thus allowing bits of the partial remainder obtained after being shifted to be referred to be only high-order 4 bits represented in the twos complement notation.

Figure 4:
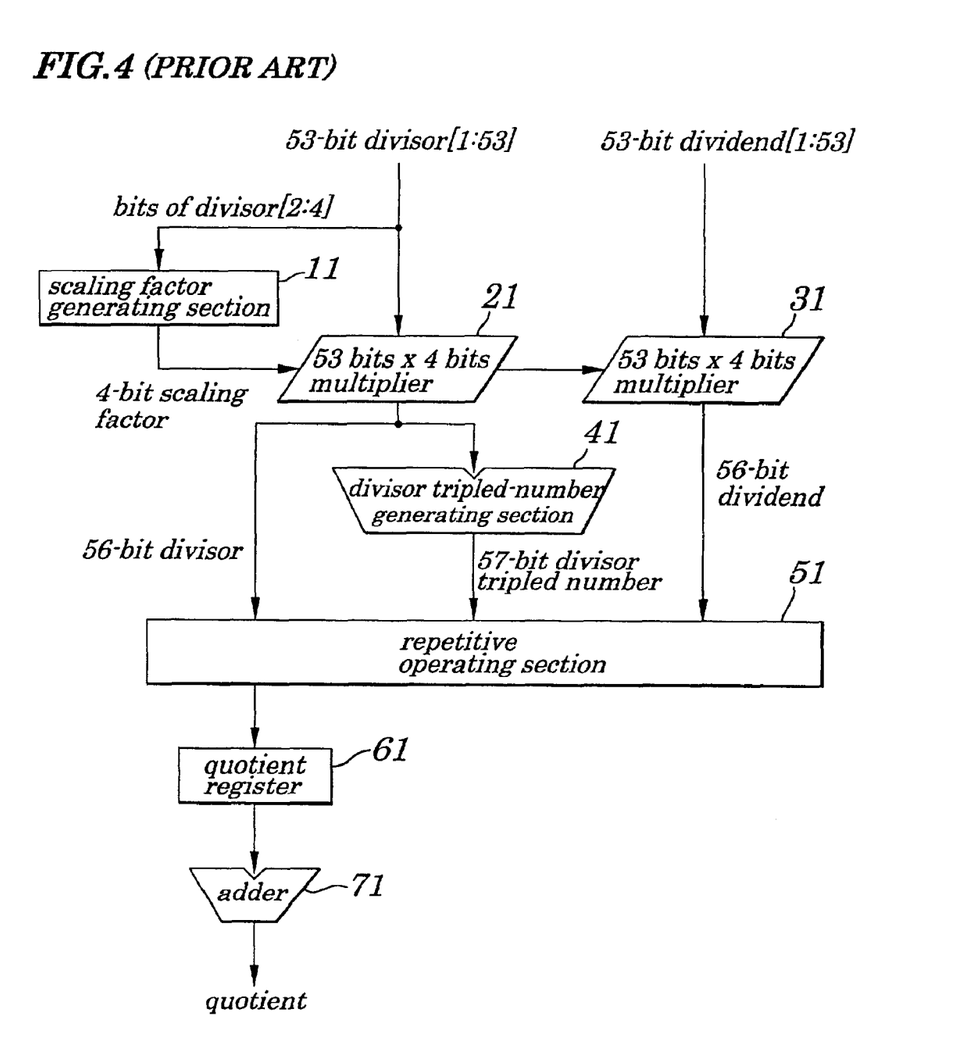
FIG. 4 is a schematic block diagram showing one example of configurations of a conventional divider.

Next, the conventional technology will be explained by referring to FIGS. 4 and 5. FIG. 4 is a schematic block diagram showing one example of configurations of a conventional divider. It is assumed in the example that the radix for operations is 4, the digit set is {−3, −2, −1, 0, 1, 2, 3}, both the divisor and dividend are decimals with a bit length of n and the generalized SRT division algorithm is used for operations. Moreover, the divisor and the dividend are input by 53 bits.

As shown in FIG. 4, the conventional divider is provided with a scaling factor generating section 11, a 53 bits×4 bits multiplier 21, a 53 bits×4 bits multiplier 31, a divisor tripled-number generating section 41, a repetitive operating section 51, a quotient register 61 and an adder 71. The scaling factor generating section 11 is adapted to generate the multiplication factor used for a scaling process. The 53 bits×4 bits multiplier 21 is adapted to multiply an input 53-bit divisor by an output from the scaling factor generating section 11 and outputs a result. The 53 bits×4 bits multiplier 31 is adapted to multiply an input 53-bit dividend by an output from the scaling factor generating section 11 and outputs a result. The divisor tripled-number generating section 41 is adapted to triple the output from the 53 bits×4 bits multiplier 21 and outputs a result. The repetitive operating section 51 is adapted to calculate a quotient by performing repetitive operations of the divisor (56 bits) being an output of the 53 bits×4 bits multiplier 21, a tripled number of the divisor (57 bits) being an output from the divisor tripled-number generating section 41 and a dividend (56 bits) being an output from the 53 bits×4 bits multiplier 31. The quotient register 61 is adapted to store an output from the repetitive operating section 51. The adder 71 is adapted to represent the quotient in the twos complement notation. FIG. 5 is a schematic circuit diagram showing one of examples of detailed configurations of the repetitive operating section 51 employed in the conventional divider of FIG. 4.

Next, operations of the divider shown in FIG. 4 will be described below. High-order 3 bits ([2:4]) except an MSB of the divisor are input to the scaling factor generating section 11 and the generated multiplication factor is input to the 53 bits×4 bits multiplier 21 and the 53 bits×4 bits multiplier 31. The multiplication factor to be here input is a value represented by 4 bits. In the 53 bits×4 bits multiplier 21 and the 53 bits×4 bits multiplier 31, the divisor and dividend are multiplied by the multiplication factor and the resulting divisor and dividend are output as values represented by 56 bits. The divisor tripled-number generating section 41 generates a 57-bit tripled number of the divisor by using the 56-bit divisor.

Next, each of the divisor represented by 56 bits, tripled number of the divisor represented by 57 bits and the dividend represented by 56 bits is input to the repetitive operating section 51. Then, in the repetitive operating section 51, division processing using the input three values is performed repeatedly to obtain a quotient.

The quotients generated by the repetitive operating section 51 are registered in the quotient register 61 and, finally, after enough quotients to satisfy the required number of bits have become available, the quotients are converted so that they are represented in the twos complement notation to become normal digits which are then output to terminate the division.

However, in the conventional divisor using the scaling technique as shown in FIG. 4, in order to select a quotient by referring to high-order 4 bits (represented in the twos complement notation) of the partial remainder obtained after being shifted, it is necessary to represent high-order 5 bits of the partial remainder obtained after being shifted in the twos complement notation. This causes a delay in computation and decreased flexibility in a circuit area in a twos complement converting circuit embedded in the repetitive operating section 51. In the repetitive operating section 51 in particular, since repetitive division processing is performed, if the repetitive operating section 51 is complicated in circuit configurations, speed of the division processing decreases accordingly.

SUMMARY OF THE INVENTION

In view of the above, it is an object of the present invention to provide a divider which is capable of obtaining a quotient by representing only high-order 4 bits of a partial remainder obtained after being shifted in a twos complement notation, by performing, in advance, a scaling of an input divisor and an input dividend so that a range of the divisor satisfies an expression of 5/3≦divisor<1.75 and of achieving high-speed division processing.

According to a first aspect of the present invention, there is provided a divider of a higher-radix type for obtaining a quotient by referring to a divisor and a dividend normalized respectively so as to satisfy a range of $\frac{1}{2}^K$ or more and less than $\frac{1}{2}^{K+1}$ (k being a positive integer), and to a length of bits defined by a radix for operations and a maximum number of digits in all bits of a partial remainder, including:

a scaling factor generating section (scaling factor generator) to generate a multiplication factor used for performing a scaling so that the divisor falls within a specified range;

a multiplying section (multiplier) to multiply each of the divisor and the dividend by the multiplication factor;

a divisor tripled-number generating section (divisor tripled-number generator) to generate a tripled number of the divisor which has been multiplied by the multiplication factor;

a repetitive operating section (repetitive calculator) to do division repeatedly by using the divisor and the dividend which has been multiplied by the multiplication factor and the tripled number of the divisor; and wherein the repetitive operating section produces a quotient by generating high-order bits of 4-bit partial remainder represented in a twos complement notation by referring to a number of high-order bits, with an arbitrary length, of the partial remainder and by referring to high-order 4 bits of the partial remainder.

In the foregoing, a preferable mode is one wherein the scaling factor generating section generates the multiplication factor so that the divisor falls within a range of $5/3 \times \frac{1}{2}^K$ or more and less than $\frac{3}{4} \times \frac{1}{2}^K$.

With configurations of the above aspects, by performing scaling so that a range of the divisor satisfies an expression 5/3≦divisor<1.75, by normalizing high-order 4 bits of the partial remainder and by referring only to four bits, the quotient can be obtained at a high speed. Moreover, since configurations of the repetitive operating circuit used to do the division repeatedly can be scaled down, time required for obtaining the quotient can be shortened.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

EMBODIMENT

Figure 1:
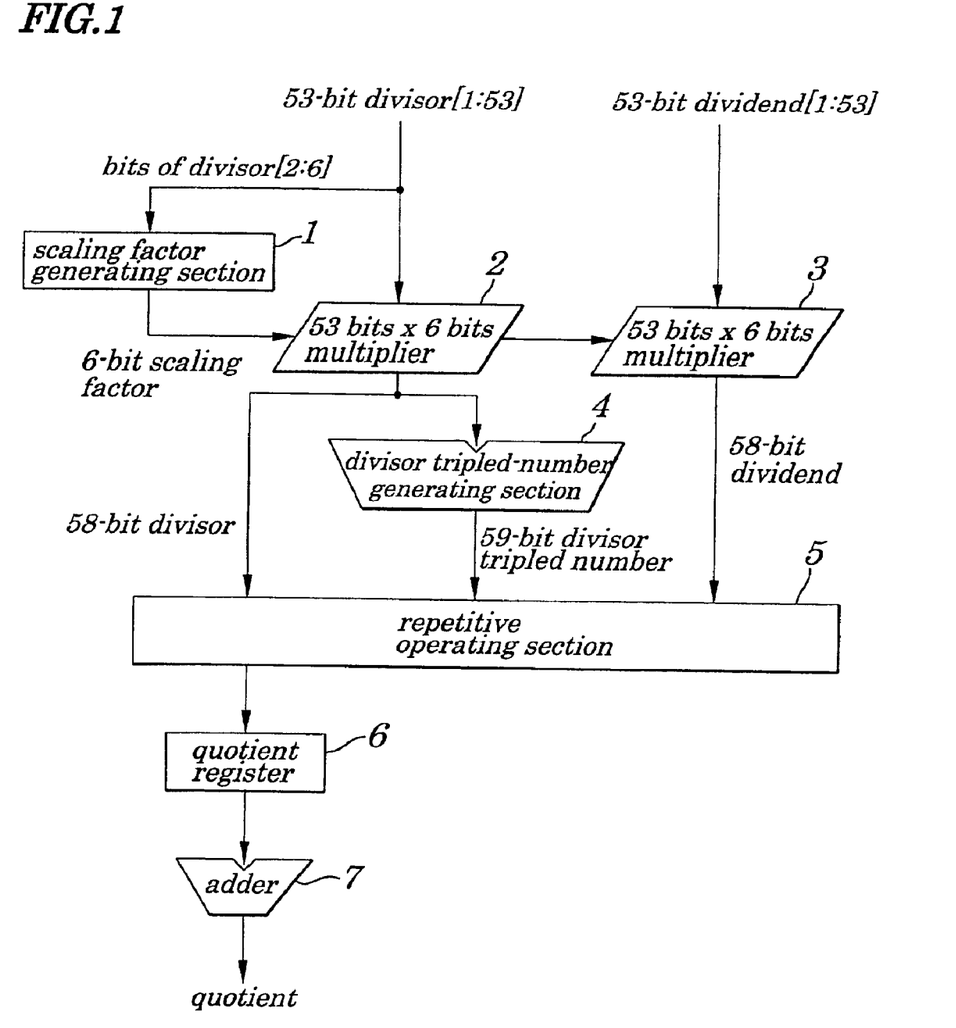
FIG. 1 is a schematic an one embodiment of the present invention.

FIG. 1 is a schematic block diagram showing configurations of a divider according to an embodiment of the present invention. It is assumed in the embodiment that a radix for operations is 4, a digit set is {−3, −2, −1, 0, 1, 2, 3}, both a divisor and a dividend are decimals with a bit length of n and a generalized SRT division algorithm is used for operations. The divider of the embodiment is provided with a scaling factor generating section 1, a 53 bits×6 bits multiplier 2, a 53 bits×6 bits multiplier 3, a divisor tripled-number generating section 4, a repetitive operating section 5, a quotient register 6 and an adder 7. The scaling factor generating section 1 is adapted to generate a multiplication factor used for a scaling process. The 53 bits×6 bits multiplier 2 is adapted to multiply an input 53-bit divisor by an output from the scaling factor generating section 1 and outputs a result. The 53 bits×6 bits multiplier 3 is adapted to multiply an input 53-bit dividend by an output from the scaling factor generating section 1 and outputs result. The divisor tripled-number generating section 4 is adapted to triple output from the 53 bits×6 bits multiplier 2 and outputs a result. The repetitive operating section 5 is adapted to calculate a quotient by performing repetitive operations of a divisor (58 bits) being an output of the 53 bits×6 bits multiplier 2, a tripled number of the divisor (59 bits) being an output from the divisor tripled-number generating section 4 and a dividend (58 bits) being an output from the 53 bits×6 bits multiplier 3. The quotient register 6 is adapted to store an output from the repetitive operating section 5. The adder 7 is adapted to represent the quotient in a twos complement notation.

Figure 2:
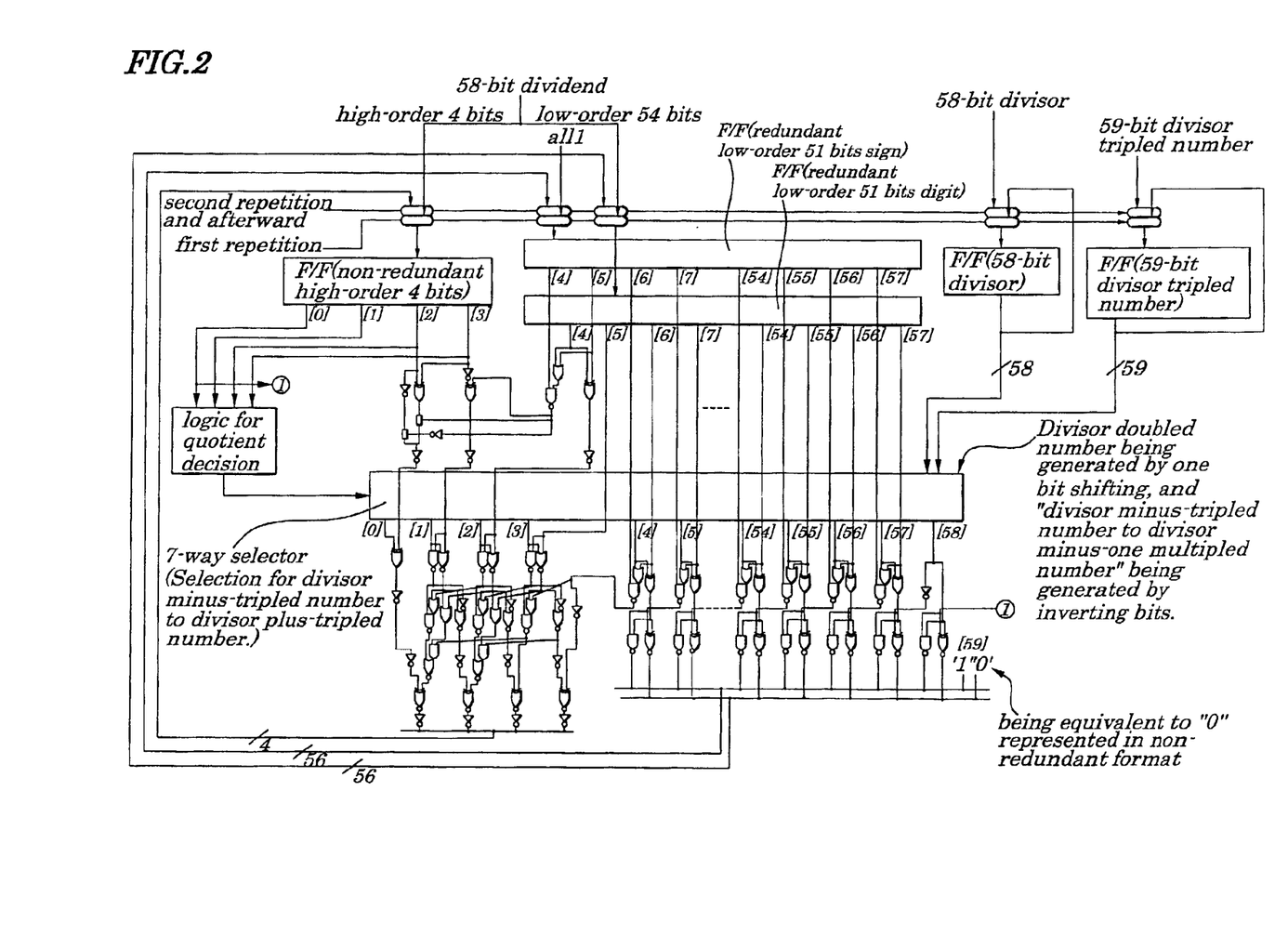
FIG. 2 is a schematic circuit diagram showing one of examples of detailed configurations of a repetitive operating section employed in the divider of FIG. 1.
Figure 3:
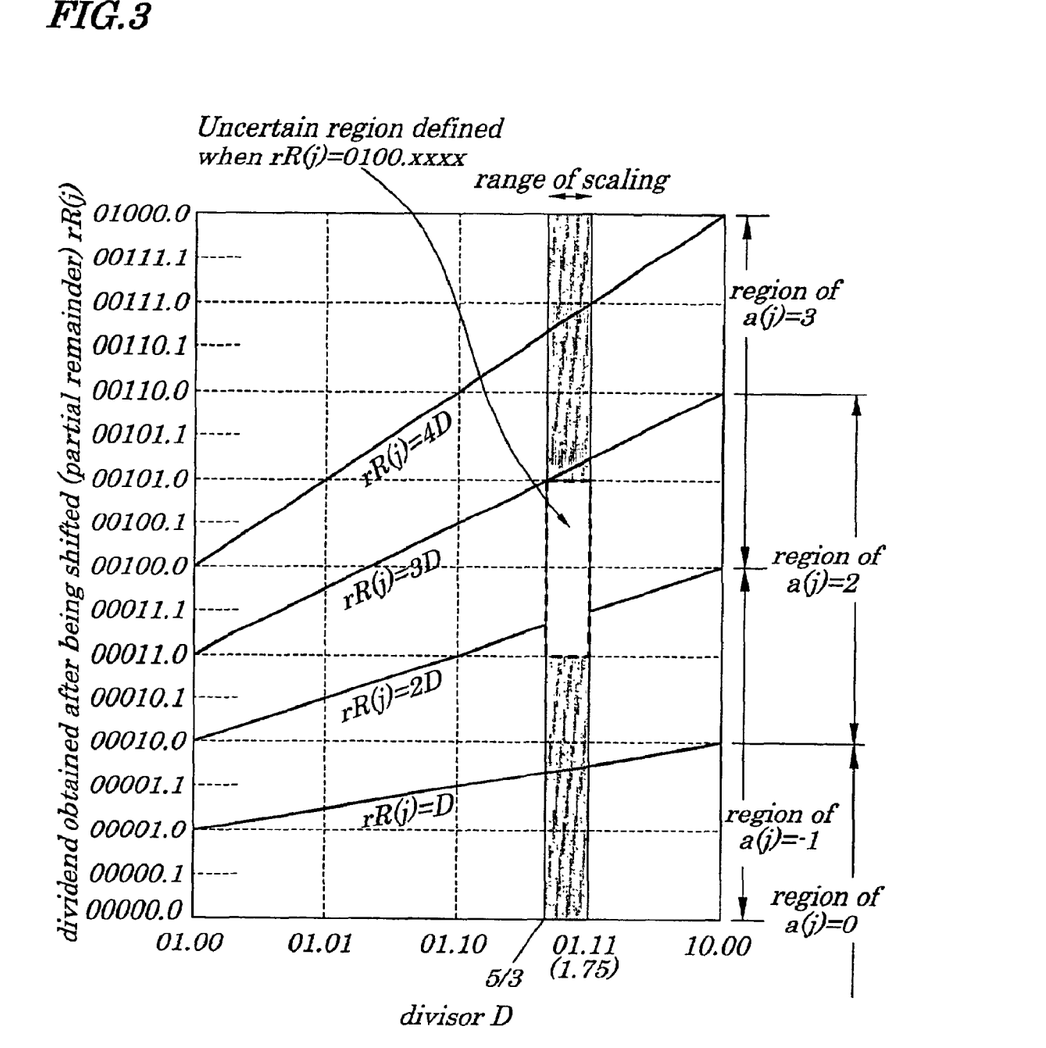
FIG. 3 is a graph showing a P-D plot expressing a division algorithm used in the divider of the embodiment of the present invention.

FIG. 2 is a schematic circuit diagram showing one of examples of detailed configurations of the repetitive operating section 5 employed in the divider of FIG. 1. A division algorithm used in the divider of the embodiment will be described using a P-D plot. FIG. 3 is a graph showing the P-D plot expressing the division algorithm used in the divider of the embodiment of the present invention. In the embodiment, the scaling is performed by using the following multiplication factors so that a range of the divisor satisfies the expression of 5/3≦divisor<1.75.

| Range of divisor | Multiplication factor | Combination of multiples |
|---|---|---|
| 1.00000 ≦ divisor < 1.03125 | 1.68750 | 1 + ½ + ⅛ + 1/16 |
| 1.03125 ≦ divisor < 1.06250 | 1.62500 | 1 + ½ + ⅛ |
| 1.06250 ≦ divisor < 1.09375 | 1.59375 | 1 + ½ + 1/16 + 1/32 |
| 1.09375 ≦ divisor < 1.12500 | 1.53125 | 1 + ½ + 1/32 |
| 1.12500 ≦ divisor < 1.15625 | 1.50000 | 1 + ½ |
| 1.15625 ≦ divisor < 1.18750 | 1.46875 | 1 + ½ − 1/32 |
| 1.18750 ≦ divisor < 1.21875 | 1.40625 | 1 + ¼ + ⅛ + 1/32 |
| 1.21875 ≦ divisor < 1.25000 | 1.37500 | 1 + ¼ + ⅛ |
| 1.25000 ≦ divisor < 1.28125 | 1.34375 | 1 + ¼ + 1/16 + 1/32 |
| 1.28125 ≦ divisor < 1.31250 | 1.31250 | 1 + ¼ + 1/16 |
| 1.31250 ≦ divisor < 1.34375 | 1.28125 | 1 + ¼ + 1/32 |
| 1.34375 ≦ divisor < 1.37500 | 1.25000 | 1 + ¼ |
| 1.37500 ≦ divisor < 1.40625 | 1.21875 | 1 + ¼ − 1/32 |
| 1.40625 ≦ divisor < 1.43750 | 1.18750 | 1 + ⅛ + 1/16 |
| 1.43750 ≦ divisor < 1.46875 | 1.18750 | 1 + ⅛ + 1/16 |
| 1.46875 ≦ divisor < 1.50000 | 1.15625 | 1 + ⅛ + 1/32 |
| 1.50000 ≦ divisor < 1.53125 | 1.12500 | 1 + ⅛ |
| 1.53125 ≦ divisor < 1.56250 | 1.09375 | 1 + 1/16 + 1/32 |
| 1.56250 ≦ divisor < 1.59375 | 1.09375 | 1 + 1/16 + 1/32 |
| 1.59375 ≦ divisor < 1.62500 | 1.06250 | 1 + 1/16 |
| 1.62500 ≦ divisor < 1.65625 | 1.03125 | 1 + 1/32 |
| 1.65625 ≦ divisor < 1.68750 | 1.03125 | 1 + 1/32 |
| 1.68750 ≦ divisor < 1.71875 | 1.00000 | 1 |
| 1.71875 ≦ divisor < 1.75000 | 1.00000 | 1 |
| 1.75000 ≦ divisor < 1.78125 | 0.96875 | 1 − 1/32 |
| 1.78125 ≦ divisor < 1.81250 | 0.93750 | 1 − 1/16 |
| 1.81250 ≦ divisor < 1.84375 | 0.93750 | 1 − 1/16 |
| 1.84375 ≦ divisor < 1.87500 | 0.90625 | 1 − ⅛ + 1/32 |
| 1.87500 ≦ divisor < 1.90625 | 0.90625 | 1 − ⅛ + 1/32 |
| 1.90625 ≦ divisor < 1.93750 | 0.87500 | 1 − ⅛ |
| 1.93750 ≦ divisor < 1.96875 | 0.87500 | 1 − ⅛ |
| 1.96875 ≦ divisor < 2.00000 | 0.87500 | 1 − ⅛ |

Moreover, the above multiplication factor, since it can be implemented by combination of a multiple of $\pm \frac{1}{2}^n$ (however, the n is a natural number including 0) as shown in the above combination of multiples, can be produced by only shifting and adding operations. To identify the range of the above divisor, reference to high-order 5 bits of the divisor except the MSB is all that is needed.

Next, operations of the divider shown in FIG. 1 will be described below. High-order 5 bits ([2:6]) except an MSB of the divisor is input to the scaling factor generating section 1 and a generated multiplication factor is input to the 53 bits×6 bits multiplier 2 and the 53 bits×6 bits multiplier 3. The multiplication factor to be here input is a value represented by 6 bits. In the 53 bits×6 bits multiplier 2 and the 53 bits×6 bits multiplier 3, the divisor and dividend are multiplied by the multiplication factor and a resulting divisor and dividend are output as values represented by 58 bits. The divisor tripled-number generating section 4 generates a 59-bit tripled number of the divisor by using the 58-bit divisor.

Next, each of the divisor represented by 58 bits, tripled number of the divisor represented by 59 bits and the dividend represented by 58 bits is input to the repetitive operating section 5. Then, in the repetitive operating section 5, division processing using the input three values is performed repeatedly to obtain a quotient.

The quotients generated by the repetitive operating section 5 are stored in the quotient register 6 and, finally, after enough quotients to satisfy a required number of bits have become available, the quotients are converted so that they are represented in the twos complement notation to become normal digits which are then output to terminate the division.

In a conventional divider as shown in FIG. 4, it is impossible to ensure accuracy required for generating the quotient only by representing the high-order 4 bits in the twos complement notation. However, in the embodiment of the present invention, by performing the scaling so that a range of the divisor satisfies the expression of 5/3≦divisor<1.75, a wider range of an uncertain region in the P-D plot can be set when compared with the conventional case, thus allowing selection of the quotient with sufficient accuracy.

In the conventional divider shown in FIG. 4, if the divider is so configured that four bits are represented by in the twos complement notation as in the embodiment of the present invention, a limited range is exceeded when the high-order bits are 0100 in binary (4.0 in decimal). In this case, a value range of the partial remainder rR(j) obtained after being shifted is:

$$3.0 < rR(j) < 5.0 \qquad (7).$$

Therefore, in the range satisfying the expression 1.5<divisor<1.75, all the regions where the quotient is 1 or 2, the quotient is 2 or 3 and the quotient is 3 are included, which cannot satisfy the above equations (1) and (2).

In the present invention, this problem is solved by imposing further limitations on the range to be scaled. In the scaling range featured by the present invention, the uncertain region defined by the expression (7) is limited to only regions where the quotient is 1 or 2 or where the quotient is 2 or 3 and the region where the quotient is limited to 3 is not included. Therefore, by selecting 2 as the quotient, the equations (1) and (2) can be satisfied.

Figure 5:
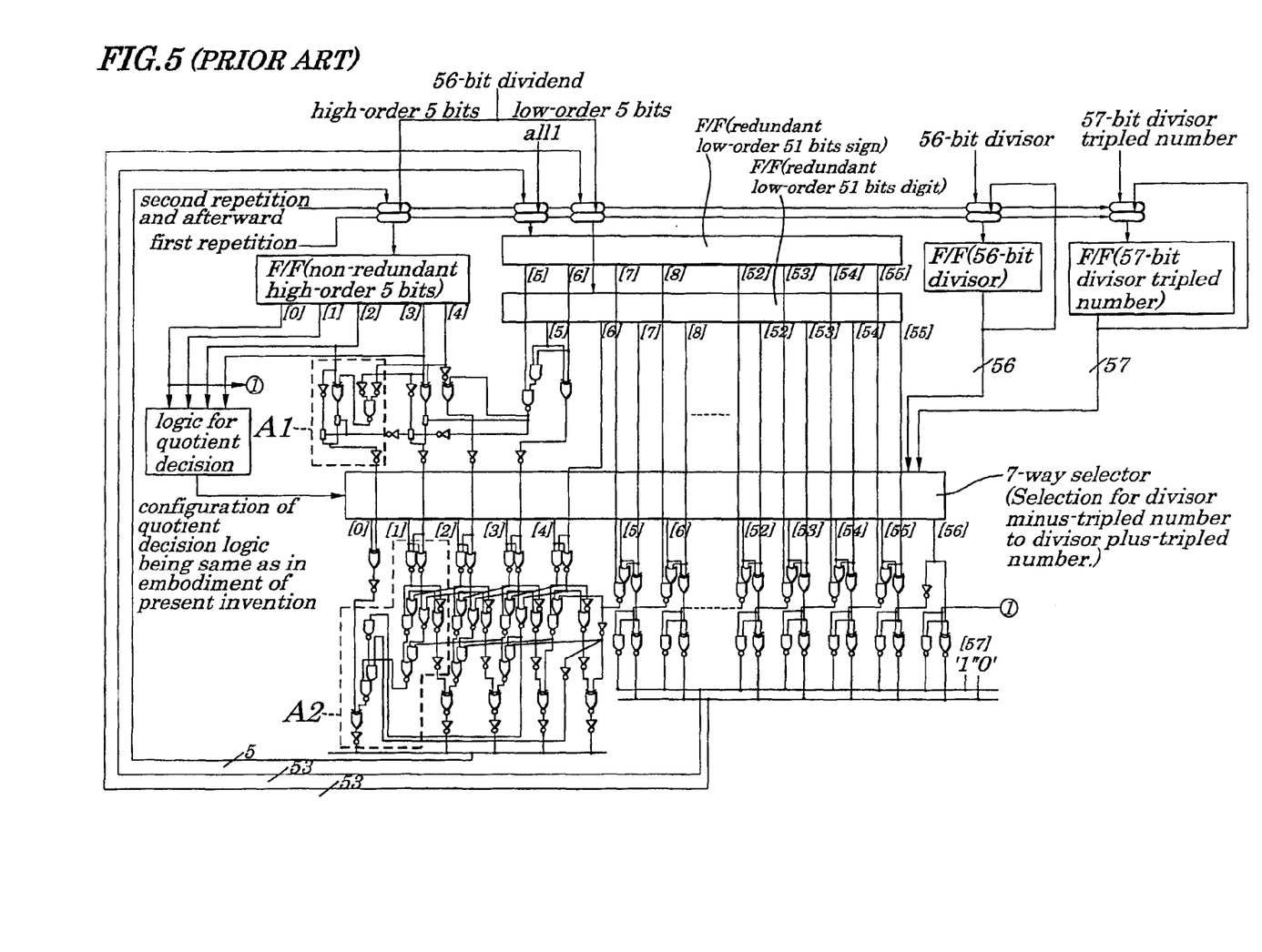
FIG. 5 is a schematic circuit diagram showing one of examples of detailed configurations of a repetitive operating section employed in the conventional divider.

Moreover, since circuit configurations of the repetitive operating section 5 shown in FIG. 2 can be more decreased in scale when compared with the repetitive operating section 51 shown in FIG. 5, it is possible to achieve more high-speed repetitive operations. In the embodiment of the present invention, though the number of bits is increased in the processing of multiplying the divisor and dividend by the multiplication factor, the multiplication processing required for obtaining the quotient is performed only once. Moreover, in the embodiment of the present invention, since the division processing is performed repeatedly by the repetitive operating section 5, by making the repetitive operating processing high-speed, time required for the entire division can be shortened. Moreover, circuit parts indicated by reference numbers A1 and A2 shown in FIG. 5 shows that these parts can be omitted in the circuit shown in FIG. 2.

It is apparent that the present invention is not limited to the above embodiments but may be changed and modified without departing from the scope and spirit of the invention.

What is claimed is:

1. A divider of a higher-radix type for obtaining a quotient by referring to a divisor and a dividend normalized respectively so as to satisfy a range of $\frac{1}{2}^{K+1}$ or more and less than $\frac{1}{2}^K$ (k being a positive integer), and to a length of bits defined by a radix for operations and a maximum number of digits in all bits of a partial remainder, comprising:

a scaling factor generating means to generate a multiplication factor used for performing a scaling so that said divisor falls within a specified range;

a multiplying means to multiply each of said divisor and said dividend by said multiplication factor;

a divisor tripled-number generating means to generate a tripled number of said divisor which has been multiplied by the multiplication factor;

a repetitive operating means to do division repeatedly by using said divisor and said dividend which has been multiplied by the multiplication factor and said tripled number of said divisor; and wherein said repetitive operating means produces a quotient by generating high-order bits of 4-bit partial remainder represented in a twos complement notation by referring to a number of high-order bits, with an arbitrary length, of said partial remainder and by referring to high-order 4 bits of said partial remainder, and wherein said scaling factor generating means generates said multiplication factor so that said divisor falls within a range of $5/3 \times \frac{1}{2}^{K+1}$ or more and less an $7/4 \times \frac{1}{2}^{K+1}$.

2. The divider according to claim 1, wherein in said repetitive operating means, said selecting means selects one out of seven kinds of multiples, minus-tripled number (+3 multiple, +2 multiple, +1 multiple, 0 multiple, −1 multiple, −2 multiple, and −3 multiple) of the quotient, in accordance with output from a logic circuit for deciding quotient, said redundant to non-redundant converting means inputs high-order 2 bits of a redundant portion and low-order 2 bits of a non-redundant portion represented in twos complement notation, in partial remainder obtained as a result of an operations cycle of last time, and then converting them to 4 bits of non-redundant data, and said 4-bit binary adding means performs addition and/or subtraction of carry over input between high-order 4 bits in the multiples of quotient output from said selecting means and a 4 bits of non-redundant data output from said redundant to non-redundant converting means, reflecting carry over input fed from said addition and/or subtraction between data other than high-order 4 bits in a redundant portion of said partial remainder and data other than high-order 4 bits in the multiples of quotient output from said selecting means.

3. A divider of a higher-radix type for obtaining a quotient by referring to a divisor and a dividend normalized respectively so as to satisfy a range of $\frac{1}{2}^{K+1}$ or more and less than $\frac{1}{2}^K$ (k being a positive integer), and to a length of bits defined by a radix for operations and a maximum number of digits in all bits of a partial remainder, comprising:

a scaling factor generator to generate a multiplication factor used or performing a scaling so that said divisor falls within a specified range;

a multiplier to multiply each of said divisor and said dividend by said multiplication factor;

a divisor tripled-number generator to generate a tripled number of said divisor which has been multiplied by the multiplication factor;

a repetitive calculator to do division repeatedly by using said divisor and said dividend which has been multiplied by the multiplication factor and said tripled number of said divisor; and wherein said repetitive calculator produces a quotient by generating high-order bits of 4-bit partial remainder represented in a twos complement notation by referring to a number of high-order bits, with an arbitrary length, of said partial remainder and by referring to high-order 4 bits of said partial remainder, and wherein said scaling factor generator generates said multiplication factor so that said divisor falls within a range of $5/3 \times \frac{1}{2}^{K+1}$ or more and less than $7/4 \times \frac{1}{2}^{K+1}$.

4. A divider of a higher-radix type for obtaining a quotient by referring to a divisor and a dividend normalized respectively so as to satisfy a range of $\frac{1}{2}^{K+1}$ or more and less than $\frac{1}{2}^K$ (k being a positive integer), and to a length of bits defined by a radix for operations and a maximum number of digits in all bits of a partial remainder, comprising:

a scaling factor generating means for generating a multiplication factor used for performing a scaling so that said divisor falls within a specified range;

a multiplying means to multiply each of said divisor and said dividend by said multiplication factor;

a divisor tripled-number generating means to generate a tripled number of said divisor which has been multiplied by the multiplication factor; and a repetitive operating means for repeatedly dividing by using said visor and said dividend which has been multiplied by the multiplication factor and said tripled number of said divisor, said repetitive operating means comprises a redundant to on-redundant converting means, a selecting means, a 4-bit binary adding means, and a redundant binary adding means, wherein, said repetitive operating means produces a quotient by generating high-order bits of 4-bit partial reminder represented in a twos complement notation by referring to a number of high-order bits, with an arbitrary length, of said partial remainder and by referring to high-order 4 bits of said partial remainder.

5. A divider of a higher-radix type for obtaining a quotient by referring to a divisor and a dividend normalized respectively as to satisfy a range of $\frac{1}{2}^{K+1}$ or more and less than $\frac{1}{2}^K$ (k being a positive integer), and to a length of bits defined by a radix for operations and a maximum number of digits in all bits of a partial remainder, comprising:

a scaling factor generator to generate a multiplication factor used for performing a scaling so that said divisor falls within a specified range;

a multiplier to multiply each of said divisor and said dividend by said multiplication factor;

a divisor tripled-number generator to generate a tripled number of said divisor which has been multiplied by the multiplication factor;

a repetitive calculator to do division repeatedly by using said divisor and said dividend which has been multiplied by the multiplication factor and said tripled number of said divisor; and wherein said repetitive calculator comprises a redundant to non-redundant converter, a selector, a 4-bit binary adder, and a redundant binary adder, said selector selecting one out of seven kinds of multiples, minus-tripled number (+3 multiple, +2 multiple, +1 multiple, 0 multiple, −1 multiple, −2 multiple, and 3-multiple of the quotient, said redundant to non-redundant converter inputting high-order 2 bits of redundant portion and low-order 2 bits of a non-redundant portion represented in twos complement notation, in partial remainder obtained as a result of an operational cycle of last time, and then converting them to 4 bits of non-redundant data, said 4-bit binary adder performing addition and/or substation of carry over input between high-order 4 bits the multiples of quotient output from said selector and said 4 bits of non-redundant data output from said redundant binary adder, said redundant binary adder performing addition and/or subtraction between data other than high-order 4 bits in a redundant portion of said partial reminder and data other then high-order 4 bits in the multiples of quotient output from said selector, thereby producing a quotient by generating high-order bits of 4-bit partial remainder represented in a twos complement notation by referring to an number of high-order bits, with an arbitrary length, of said partial remainder and by referring to high-order 4 bits of said partial remainder.

* * * * *

UNITED STATES PATENT AND TRADEMARK OFFICE
CERTIFICATE OF CORRECTION

PATENT NO. : 6,847,986 B2
DATED : January 25, 2005
INVENTOR(S) : Shigeto Inui

It is certified that error appears in the above-identified patent and that said Letters Patent is hereby corrected as shown below:

Title page,
Item [*] Notice, delete "This patent is subject to a terminal disclaimer.".

Signed and Sealed this

Thirtieth Day of August, 2005

JON W. DUDAS
*Director of the United States Patent and Trademark Office*